US011312861B2

(12) United States Patent
Courtemanche et al.

(10) Patent No.: US 11,312,861 B2
(45) Date of Patent: Apr. 26, 2022

(54) SOLID CARRIER COMPONENT INCLUDING A LIQUID POLYORGANOSILOXANE AND METHODS FOR PREPARATION AND USE OF THE SOLID CARRIER COMPONENT

(71) Applicant: Dow Silicones Corporation, Midland, MI (US)

(72) Inventors: Marc-Andre Courtemanche, Midland, MI (US); James R. Keenihan, Midland, MI (US); Igor Chorvath, Midland, MI (US); Keith Bruce, Midland, MI (US); Jodi M. Mecca, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/050,874

(22) PCT Filed: Jun. 10, 2020

(86) PCT No.: PCT/US2020/036886
§ 371 (c)(1),
(2) Date: Oct. 27, 2020

(87) PCT Pub. No.: WO2021/025772
PCT Pub. Date: Feb. 11, 2021

(65) Prior Publication Data
US 2022/0041863 A1 Feb. 10, 2022

Related U.S. Application Data

(60) Provisional application No. 62/883,679, filed on Aug. 7, 2019.

(51) Int. Cl.
*C08L 97/02* (2006.01)
*C08L 23/06* (2006.01)
*C08L 23/08* (2006.01)

(52) U.S. Cl.
CPC .............. *C08L 97/02* (2013.01); *C08L 23/06* (2013.01); *C08L 23/0815* (2013.01); C08L 2205/025 (2013.01); C08L 2205/035 (2013.01); C08L 2207/062 (2013.01); C08L 2207/066 (2013.01); C08L 2207/20 (2013.01)

(58) Field of Classification Search
CPC ...... C08L 97/02; C08L 23/06; C08L 23/0815; C08L 2205/025; C08L 2205/035; C08L 2207/062; C08L 2207/066; C08L 2207/20
USPC .......................................................... 524/14
See application file for complete search history.

(56) References Cited

U.S. PATENT DOCUMENTS

| | | | |
|---|---|---|---|
| 3,645,992 A | 2/1972 | Elston | |
| 4,076,698 A | 2/1978 | Anderson et al. | |
| 4,535,113 A | 8/1985 | Foster et al. | |
| 4,857,593 A | 8/1989 | Leung et al. | |
| 4,925,890 A | 5/1990 | Leung et al. | |
| 5,034,278 A | 7/1991 | Turbett | |
| 5,272,236 A | 12/1993 | Lai et al. | |
| 5,278,272 A | 1/1994 | Lai et al. | |
| 5,356,585 A | 10/1994 | Romenesko | |
| 5,543,189 A | 8/1996 | Nakakura et al. | |
| 5,582,923 A | 12/1996 | Kale et al. | |
| 5,708,084 A | 1/1998 | Hauenstein et al. | |
| 5,708,085 A | 1/1998 | Hauenstein et al. | |
| 5,789,473 A | 8/1998 | Hauenstein et al. | |
| 5,902,854 A * | 5/1999 | Kelley | C08L 23/04 525/101 |
| 6,013,217 A | 1/2000 | Hauenstein et al. | |
| 6,080,489 A | 6/2000 | Mehta | |
| 6,288,144 B1 | 9/2001 | Roberts et al. | |
| 6,344,515 B1 | 2/2002 | Parikh et al. | |
| 6,569,931 B2 | 5/2003 | Furukawa et al. | |
| 6,660,807 B2 | 12/2003 | Morita et al. | |
| 6,743,507 B2 | 6/2004 | Barlow et al. | |
| 7,897,666 B1 | 3/2011 | Berg | |
| 7,897,689 B2 | 3/2011 | Harris et al. | |
| 8,058,330 B2 | 11/2011 | Irie et al. | |
| 8,460,797 B1 | 6/2013 | Buhrts et al. | |
| 8,722,773 B2 | 5/2014 | Hamilton et al. | |
| 9,073,295 B2 | 7/2015 | Przybylinski et al. | |
| 9,085,671 B2 | 7/2015 | Van Remortel | |
| 9,595,365 B2 | 3/2017 | Esseghir et al. | |
| 9,796,839 B2 | 10/2017 | Alric et al. | |
| 10,246,580 B2 | 4/2019 | Arrigoni et al. | |
| 10,563,022 B2 | 2/2020 | Chaudhary et al. | |
| 10,723,891 B2 | 7/2020 | Chevalier et al. | |

(Continued)

FOREIGN PATENT DOCUMENTS

| | | |
|---|---|---|
| CN | 101899181 | 12/2010 |
| CN | 102040766 | 5/2011 |

(Continued)

OTHER PUBLICATIONS

Search report from corresponding Korea 10-2020-7033485 application, dated Apr. 6, 2020.
Branderup, "Polymer Handbook", Wiley, 1999, p. 1-76, Section 2, 4th Ed., New York City.
Chemie, "Genioplast HDPE 20A03." Wacker Genioplast. Germany. 2016, p. 1-2.
Chemie., "Genioplast Pellet S. Polymer Additive." Wacker Genioplast. Germany. 2014, p. 1-2.
Chemie., "Wacker introduces additives for wood-plastic composites, bioplastics and more." Additives and Polymers. 2017, p. 5-6.
Gregorio., "Consumer Solution." 2018, p. 1-18.
Hristov., "Thermoplastic Silicone Elastomer Lubricant in Extrusion of Polypropylene Wood Flour Composites." Advances in Polymer Technology. 2007, p. 100-108, vol. 26, No. 2.

(Continued)

*Primary Examiner* — Ling Siu Choi
*Assistant Examiner* — Ronald Grinsted
(74) *Attorney, Agent, or Firm* — Catherine U. Brown

(57) ABSTRACT

A solid carrier component includes a liquid polydiorganosiloxane, an ethylene-based polymer, and a maleated ethylene-based polymer. The solid carrier component is useful in processes for preparing filled composite articles, such as wood plastic composite building materials.

16 Claims, No Drawings

(56) References Cited

U.S. PATENT DOCUMENTS

| | | |
|---|---|---|
| 2003/0114569 A1 | 6/2003 | Morita et al. |
| 2003/0119974 A1* | 6/2003 | Parikh .................. B32B 7/12 |
| | | 524/578 |
| 2004/0204519 A1 | 10/2004 | Fender et al. |
| 2008/0027161 A1 | 1/2008 | Schlosser et al. |
| 2008/0058460 A1 | 3/2008 | Tonge et al. |
| 2008/0073627 A1 | 3/2008 | Goode et al. |
| 2008/0132654 A1 | 6/2008 | Ho et al. |
| 2009/0007818 A1 | 1/2009 | Militz et al. |
| 2009/0137716 A1 | 5/2009 | Furukawa et al. |
| 2014/0316041 A1 | 10/2014 | Mehta |
| 2017/0342221 A1 | 11/2017 | Geck et al. |
| 2019/0023895 A1 | 1/2019 | Harris et al. |

FOREIGN PATENT DOCUMENTS

| | | | |
|---|---|---|---|
| CN | 102093735 | 6/2011 | |
| CN | 101967242 | 7/2012 | |
| CN | 103374194 | 10/2013 | |
| CN | 103483838 | 1/2014 | |
| CN | 103642121 | 3/2014 | |
| CN | 102942797 | 1/2015 | |
| CN | 104403199 | 3/2015 | |
| CN | 103102589 | 6/2015 | |
| CN | 104804452 | 7/2015 | |
| CN | 105038283 | 11/2015 | |
| CN | 105348835 | 2/2016 | |
| CN | 105350741 | 2/2016 | |
| CN | 103819801 | 3/2016 | |
| CN | 106221220 | 12/2016 | |
| CN | 106317743 | 1/2017 | |
| CN | 106380878 | 2/2017 | |
| CN | 108034171 | 5/2018 | |
| CN | 108250908 | 7/2018 | |
| CN | 108384267 | 8/2018 | |
| CN | 108485123 | 9/2018 | |
| EP | 0600166 | 2/1997 | |
| EP | 0722981 | 1/2001 | |
| EP | 1211277 | 6/2002 | |
| EP | 1554337 | 11/2006 | |
| EP | 2872565 | 3/2017 | |
| JP | 2000109696 | 4/2020 | |
| KR | 20170133720 | 12/2017 | |
| WO | 2007071732 | 6/2007 | |
| WO | 2015024283 | 5/2015 | |
| WO | 2015076970 | 5/2015 | |
| WO | WO-2016176034 A1 * | 11/2016 | ............. C08J 3/201 |
| WO | WO-2017186586 A1 * | 11/2017 | ........... C09D 129/06 |
| WO | 2018049555 | 3/2018 | |

OTHER PUBLICATIONS

Khalid., "The Effectiveness of Polydimethylsiloxane (PDMS) and Hexamethyldisiloxane (HMDSO) as Compatibilizer on the Preparation of Betel Nut Fiber (BNF) and Polypropylene (PP) /Polystyrene (PS) Wood Composites." The Malaysian Journal of Analytical Sciences. Malaysia, 2014, p. 629-641.

Murphy, "Additives for plastics handbook." Elsevier, 2001.

ASTM D792-13; "Standard Test Method for Density and Specific Gravity (Relative Density) of Plastics by Displacement." ASTM International. 2019, p. 1-6.

ASTM D3418-15; "Standard Test Method for Transition Temperatures and Enthalpies of Fusion and Crystallization of Polymers by Differential Scanning Calorimetry." ASTM International. 2019, p. 1-7.

"Stuktol TPW 104 Processing Additive." 2016, p. 1-2.

Tullo., "Introducing the New Dow." Petrochemicals. 2018, p. 1-4, vol. 96, issue 46.

Walker., "Handbook of thermoplastic elastomers." New York. 1979.

First Office Action regarding Japanese Application No. 2020-565383, dated Aug. 30, 2021.

* cited by examiner

SOLID CARRIER COMPONENT INCLUDING A LIQUID POLYORGANOSILOXANE AND METHODS FOR PREPARATION AND USE OF THE SOLID CARRIER COMPONENT

CROSS REFERENCE TO RELATED APPLICATIONS

This application is a U.S. national stage filing under 35 U.S.C. § 371 of PCT Application No. PCT/US20/036886 filed on 10 Jun. 2020, which claims the benefit of U.S. Provisional Patent Application No. 62/883,679 filed 7 Aug. 2019 under 35 U.S.C. § 119 (e). PCT Application No. PCT/US20/036886 and U.S. Provisional Patent Application No. 62/883,679 are hereby incorporated by reference.

TECHNICAL FIELD

A solid carrier component includes a liquid polyorganosiloxane, an ethylene-based polymer, and a maleated ethylene-based polymer. The solid carrier component is formulated to minimize migration of the liquid polyorganosiloxane out of the solid carrier component upon aging.

BACKGROUND

Using silicone fluids such as polydimethylsiloxanes as additives in thermoplastic polymer systems presented challenges in handling for the end use application. These silicone fluids are generally liquids and gums that are difficult to handle in producing products by processes such as injection molding, profile extrusion or film manufacturing. These types of processes generally are not set up for feeding liquid or gum. The common solution to the problem is to produce a silicone masterbatch by mixing a silicone fluid into a polymer pellet that can be blended as a solid into a final formulation during the finished good manufacturing.

Previous silicone masterbatches used silicone fluids of viscosities greater than 50,000 cSt so that the large molecular weight could prevent the material from migrating out of the pellet in manufacturing or handling.

Problems to be Solved

Recent studies have shown that using a lower molecular weight, lower viscosity silicone fluid (as compared to the silicone fluids of viscosities greater than 50,000 cSt described above) can provide additional benefits in extrusion processes, such as reducing shear related defects in extruded profiles, reducing torque, reducing melt temperature and/or reducing energy requirements to produce extruded products, and/or and improving mixing in the extruder, thereby improving final formulation costs and/or properties. These lower molecular weight silicone fluids have been found to offer benefits superior to the higher molecular weight silicone fluids. However, these lower viscosity/low molecular weight silicone fluids can reintroduce the problems of pellet manufacturing and "bleeding" of silicone in storage or handling that lead to the high molecular weight solutions described above.

SUMMARY

A solid carrier component comprises an ethylene-based polymer, a maleated ethylene-based polymer, and a hydroxyl-functional polyorganosiloxane. The solid carrier component is useful for fabrication of wood plastic composite articles.

DETAILED DESCRIPTION

A solid carrier component comprises: 40% to 80% of (A) an ethylene-based polymer with a melt index>2 g/10 min measured at 190° C. and 2.16 Kg according to ASTM D1238—13, 10% to 25% of (B) a maleated ethylene-based polymer, 10% to 25% of (C) a bis-hydroxyl terminated polydiorganosiloxane with a viscosity of 5,000 mPa·s to 25,000 mPa·s; and 0 to 10% of (D) a filler. Alternatively, the solid carrier component consists essentially of starting materials (A), (B), (C), and (D). Alternatively, the solid carrier component consists of starting materials (A), (B), (C), and (D). Alternatively, the solid carrier component consists essentially of starting materials (A), (B), and (C). Alternatively, the solid carrier component consists of starting materials (A), (B), and (C).

(A) Ethylene-Based Polymer

The solid carrier component described above comprises (A) an ethylene-based polymer. As used herein, "ethylene-based" polymers are polymers prepared from ethylene monomers as the primary (i.e., greater than 50%) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. The generic term interpolymer includes copolymers (usually employed to refer to polymers prepared from two different monomer types), and polymers prepared from more than two different monomer types (e.g., terpolymers (three different monomer types) and tetrapolymers (four different monomer types)).

The ethylene-based polymer can be an ethylene homopolymer. As used herein, "homopolymer" denotes a polymer comprising repeating units derived from a single monomer type, but does not exclude residual amounts of other components used in preparing the homopolymer, such as catalysts, initiators, solvents, and chain transfer agents.

Alternatively, the ethylene-based polymer can be an ethylene/alpha-olefin ("α-olefin") interpolymer having an α-olefin content of at least 1%, alternatively at least 5%, alternatively at least 10%, alternatively at least 15%, alternatively at least 20%, or alternatively at least 25 wt % based on the entire interpolymer weight. These interpolymers can have an α-olefin content of less than 50%, alternatively less than 45%, alternatively less than 40%, or alternatively less than 35% based on the entire interpolymer weight. When an α-olefin is employed, the α-olefin can have 3 to 20 carbon atoms (C3-C20) and be a linear, branched or cyclic α-olefin. Examples of C3-20 α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

The ethylene-based polymer can be one ethylene-based polymer or a combination of two or more ethylene-based polymers (e.g., a blend of two or more ethylene-based polymers that differ from one another by monomer composition, monomer content, catalytic method of preparation, molecular weight, molecular weight distributions, and/or densities). If a blend of ethylene-based polymers is employed, the polymers can be blended by any in-reactor or post-reactor process.

The ethylene-based polymer can be a linear-low-density polyethylene ("LLDPE"). LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs may have densities ranging from 0.91 g/cm$^3$ to 0.94 g/cm$^3$. Densities for the LLDPEs and other ethylene-based polymers described herein are determined by ASTM D792—13. LLDPEs suitable for use herein can have a melt index ($I_2$)>2 g/10 min, alternatively 2.3 g/10 min to 20 g/10 min, alternatively 2.3 g/10 min to 12 g/10 min, alternatively 2.3 g/10 min to 6 g/10 min. Melt indices for LLDPEs and other ethylene-based polymers are determined at 190° C. and 2.16 Kg according to ASTM D1238—13. The LLDPE can have a melting temperature of at least 124° C., alternatively 124° C. to 135° C., and alternatively 124° C. to 132° C. Melting temperatures for LLDPEs and other polyethylene-based polymers are determined by DSC.

LLDPE's are known in the art and may be produced by known methods. For example, LLDPE may be made using Ziegler-Natta catalyst systems as well as single-site catalysts such as bis-metallocenes (sometimes referred to as "m-LLDPE"), post-metallocene catalysts, and constrained geometry catalysts. LLDPEs include linear, substantially linear or heterogeneous polyethylene copolymers or homopolymers. LLDPEs may contain less long chain branching than LDPEs, and LLDPEs include: substantially linear ethylene polymers which are further defined in U.S. Pat. Nos. 5,272,236, 5,278,272, and 5,582,923; homogeneously branched linear ethylene polymer compositions such as those in U.S. Pat. No. 3,645,992; and/or heterogeneously branched ethylene polymers such as those prepared according to the process disclosed in U.S. Pat. No. 4,076,698. The LLDPEs can be made via gas-phase, solution-phase or slurry polymerization or any combination thereof, using any type of reactor or reactor configuration known in the art.

Alternatively, the ethylene-based polymer can be a medium-density polyethylene ("MDPE"). MDPEs are ethylene-based polymers having densities generally ranging from 0.926 to 0.940 g/cm$^3$. Alternatively, the MDPE can have a density ranging from 0.930 to 0.939 g/cm$^3$. The MDPE can have $I_2$>2 g/10 min, alternatively 2.3 g/10 min to 20 g/10 min, alternatively 2.3 g/10 min to 12 g/10 min, and alternatively 2.3 g/10 min to 6 g/10 min. The MDPE can have a melting temperature of at least 124° C., alternatively 124° C. to 135° C., and alternatively 124° C. to 132° C. MDPE may be made using chromium or Ziegler-Natta catalysts or using metallocene, constrained geometry, or single site catalysts, and typically have MWD greater than 2.5.

Alternatively, the ethylene-based polymer can be a high-density polyethylene ("HDPE"). HDPEs are ethylene-based polymers having densities of at least 0.940 g/cm$^3$. Alternatively, the HDPE can have a density of >0.940 g/cm$^3$ to 0.970 g/cm$^3$, alternatively >0.940 g/cm$^3$ to 0.965 g/cm$^3$, alternatively >0.940 to 0.952 g/cm$^3$. The HDPE can have a melting temperature of at least 124° C., alternatively 124° C. to 135° C., alternatively 124° C. to 132° C., alternatively 130° C. to 133° C., and alternatively 131° C. to 132° C. The HDPE can have a melt index ($I_2$) >2 g/10 min, alternatively 2.3 g/10 min to 20 g/10 min, alternatively 3 g/10 min to 12 g/10 min, alternatively 4 g/10 min to 7 g/10 min. The HDPE can have a polydispersity index ("PDI") of 1.0 to 30.0, alternatively 2.0 to 15.0, as determined by GPC.

The HDPE suitable for use herein can be unimodal. As used herein, "unimodal" denotes an HDPE having a MWD such that its GPC curve exhibits only a single peak with no discernible second peak, or even a shoulder or hump, relative to such single peak. In contrast, "bi-modal" means that the MWD in a GPC curve exhibits the presence of two component polymers, such as by having two peaks or where one component may be indicated by a hump, shoulder, or tail relative to the peak of the other component polymer. HDPEs are known in the art and may be made by known methods. For example, HDPEs may be prepared with Ziegler-Natta catalysts, chrome catalysts or even metallocene catalysts.

Alternatively, the ethylene-based polymer for starting material (A) may be selected from the group consisting of HDPE, MDPE, LLDPE, and a combination thereof. Alternatively, the ethylene-based polymer for starting material (A) may be selected from the group consisting of HDPE, LLDPE, and a combination thereof. Alternatively, the ethylene-based polymer for starting material (A) may be selected from the group consisting of HDPE and LLDPE. Alternatively, the ethylene-based polymer for starting material (A) may be HDPE. Preparation methods for ethylene-based polymers are well known in the art. Any methods known or hereafter discovered for preparing an ethylene-based polymer having the desired properties may be employed for making the ethylene-based polymer. Suitable LLDPEs, MDPEs, and HDPEs may be prepared by methods described above or those disclosed in PCT Publication No. WO2018/049555 and U.S. Patent Application Publication No. 2019/0023895, and the references cited therein. Suitable ethylene-based polymers for use herein are commercially available from The Dow Chemical Company of Midland, Mich., USA, and are exemplified by those with melt index>2 g/10 min shown below in Table 2.

The ethylene-based polymer can be present in the solid carrier component in an amount of 40% to 80%, alternatively 50% to 80%, alternatively 50% to 70%, alternatively 50% to 60%, and alternatively 60% to 70% based on combined weights of all starting materials in the solid carrier component.

(B) Maleated Ethylene-Based Polymer

The solid carrier component described above further comprises (B) a maleated ethylene-based polymer. As used herein, the term "maleated" indicates a polymer (e.g., an ethylene-based polymer) that has been modified to incorporate a maleic anhydride monomer. Maleic anhydride can be incorporated into the ethylene-based polymer by any methods known or hereafter discovered in the art. For instance, the maleic anhydride can be copolymerized with ethylene and other monomers (if present) to prepare an interpolymer having maleic anhydride residues incorporated into the polymer backbone. Alternatively, the maleic anhydride can be graft-polymerized to the ethylene-based polymer. Techniques for copolymerizing and graft polymerizing are known in the art.

The maleated ethylene-based polymer may be an ethylene-based polymer having maleic anhydride grafted thereon.

The ethylene-based polymer prior to being maleated can be any of the ethylene-based polymers described above, alternatively, the ethylene-based polymer used for maleating may have a melt index lower than that melt index of the ethylene-based polymer described above. The starting ethylene-based polymer can be selected from a linear-low density polyethylene, a medium-density polyethylene, and a high-density polyethylene. Alternatively, the starting ethylene-based polymer can be a high-density polyethylene.

The maleated ethylene-based polymer may have a density of at least 0.923 g/cm$^3$. Alternatively, the maleated ethylene-based polymer can have a density of 0.923 g/cm$^3$ to 0.962 g/cm$^3$, alternatively 0.940 g/cm$^3$ to 0.962 g/cm$^3$, and alternatively 0.923 g/cm$^3$ to 0.940 g/cm$^3$. The maleated ethylene-based polymer may have a melt index ($I_2$) of 0.1 g/10 min to 25 g/10 min, alternatively 1 g/10 min to 2 g/10 min, alternatively 2 g/10 min to 25 g/10 min, alternatively 2 g/10 min to 12 g/10 min, alternatively 3 g/10 min to 25 g/10 min, and alternatively 3 g/10 min to 12 g/10 min. Densities, melt indices, and melting temperatures of the maleated ethylene-based polymers may be evaluated using the ASTM methods described herein for the ethylene-based polymers. The maleated ethylene-based polymer can have a maleic anhydride content of at least 0.25%, alternatively an amount of 0.25% to 2.5%, and alternatively 0.5% to 1.5%, each based on the total weight of the maleated ethylene-based polymer. Maleic anhydride concentrations may be determined by a titration method, which takes dried resin and titrates with 0.02N KOH to determine the amount of maleic anhydride. The dried polymers are titrated by dissolving 0.3 to 0.5 grams of maleated ethylene-based polymer in 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

Suitable maleated ethylene-based polymers for starting material (B) may be prepared by known methods, such as those disclosed in PCT Publication No. WO2018/049555 and the references cited therein. Alternatively, maleated ethylene-based polymers may be prepared by a process for grafting maleic anhydride on an ethylene-based polymer, which can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section 11, pp. 1-76.). Alternatively, the species that is formed by the decomposition of the initiator may be an oxygen-based free radical. Alternatively, the initiator may be selected from the group consisting of carboxylic peroxyesters, peroxyketals, dialkyl peroxides, and diacyl peroxides. Exemplary initiators, commonly used to modify the structure of polymers, are listed in U.S. Pat. No. 7,897,689, in the table spanning Col. 48 line 13-Col. 49 line 29. Alternatively, the grafting process for making maleated ethylene-based polymers can be initiated by free radicals generated by thermal oxidative processes. Suitable maleated ethylene-based polymers are commercially available from The Dow Chemical Company, of Midland, Mich., USA, and examples are shown below in Table 1.

TABLE 1

Examples of Maleated Ethylene-Based Polymers

| Type | a random ethylene copolymer incorporating a monomer which is classified as being a maleic anhydride equivalent | high density polyethylene grafted with very high maleic anhydride copolymer graft level |
|---|---|---|
| Density (g/cm$^3$) | 0.940 | 0.962 |
| $I_2$ (g/10 min) | 25 | 2.0 |
| Melting Temperature (° C.) | 108 | 130 |

In Table 1, melting temperature of the random ethylene copolymer incorporating a monomer which is classified as being a maleic anhydride equivalent was measured by DSC according to ASTM D3418—15, and melting temperature of the high density polyethylene grafted with very high maleic anhydride copolymer graft level was measured by DSC wherein a film was conditioned at 230° C. for 3 minutes before cooling at a rate of 10° C. per minute to a temperature of −40° C. After the film was kept at −40° C. for 3 minutes, the film was heated to 200° C. at a rate of 10° C. per minute.

The maleated ethylene-based polymer can be present in the solid carrier component in an amount of 10% to 25%, alternatively 10% to <25%, alternatively >10% to <20%, alternatively 10% to 15%, alternatively 15% to 20%, and alternatively 10% to 20%, based on combined weights of all starting materials in the solid carrier component.

(C) Bis-Hydroxyl-Terminated Polydiorganosiloxane

The solid carrier component further comprises (C) a bis-hydroxyl-terminated polydiorganosiloxane with a viscosity of 5,000 mPa·s to 25,000 mPa·s. Viscosity was measured at 25° C. at 5 RPM on a Brookfield DV-III cone & plate viscometer with #CP-52 spindle. The bis-hydroxyl-terminated polydiorganosiloxane may have formula:

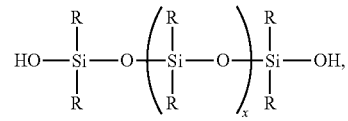

where each R is an independently selected monovalent hydrocarbon group of 1 to 18 carbon atoms, and subscript x has a value sufficient to give the bis-hydroxyl-terminated polydiorganosiloxane the viscosity described above. Alternatively, viscosity may be 5,000 mPa·s to 20,000 mPa·s, alternatively 5,000 mPa·s to 15,000 mPa·s, alternatively 6,000 mPa·s to 13,500 mPa·s, alternatively 12,000 mPa·s to 15,000 mPa·s, alternatively 5,400 mPa·s to 6,600 mPa·s, and alternatively 5,400 mPa·s to 15,000 mPa·s; and the value for subscript x is sufficient to give the bis-hydroxyl-terminated polydiorganosiloxane this viscosity.

Alternatively, each R may be an alkyl group of 1 to 18 carbon atoms, alternatively 1 to 12 carbon atoms, alternatively 1 to 6 carbon atoms, and alternatively 1 to 4 carbon atoms, and starting material (C) may be a bis-hydroxyl-terminated polydialkylsiloxane. Suitable alkyl groups include methyl, ethyl, propyl (including n-propyl and iso-propyl), and butyl (including n-butyl, tert-butyl, sec-butyl, and iso-butyl). Alternatively, each R may be methyl.

Suitable bis-hydroxy-terminated polydiorganosiloxanes may be prepared by methods known in the art such as hydrolysis and condensation of appropriate organohalosilane monomers and/or equilibration of linear and cyclic polyorganosiloxanes. The bis-hydroxy-terminated polydiorganosiloxane may be a bis-OH terminated polydimethylsiloxane, which is commercially available. Bis-OH terminated polydimethylsiloxanes are commercially available from Dow Silicones Corporation of Midland, Mich., USA The hydroxyl-terminated polydiorganosiloxane may be present in the solid carrier component in an amount of 10% to 25%, alternatively 10% to <25%, alternatively >10% to <25%, alternatively 10% to 20%, and alternatively >10% to 20%, based on combined weights of all starting materials in the solid carrier component.

(D) Filler

The solid carrier component may optionally further comprise up to 10% of a filler. The filler may be a mineral filler. Specific examples of suitable fillers include, but are not limited to, calcium carbonate, silica, quartz, fused quartz, talc, mica, clay, kaolin, wollastonite, feldspar, aluminum hydroxide, carbon black, and graphite. Fillers are known in the art and are commercially available, e.g., ground silica is sold under the name MIN-U-SIL by U.S. Silica of Berkeley Springs, W. Va., USA. Suitable precipitated calcium carbonates include Winnofil™ SPM from Solvay and Ultra-pflex™ and Ultra-pflex™ 100 from Specialty Minerals, Inc. of Quinnesec, Mich., USA.

The shape and dimensions of the filler is not specifically restricted. For example, the filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the filler utilized, the selection of other starting materials included within the solid carrier component.

Regardless of the selection of the filler, the filler may be untreated, pretreated, or added in conjunction with an optional filler treating agent, described below, which when so added may treat the filler in situ or prior to incorporation of the filler in the solid carrier component. Alternatively, the filler may be surface treated to facilitate wetting or dispersion in the solid carrier component, which when so added may treat the filler in situ in the composition.

The filler treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, an organosilicon compound, a stearate, or a fatty acid. The filler treating agent may comprise a single filler treating agent, or a combination of two or more filler treating agents selected from similar or different types of molecules.

The filler treating agent may comprise an alkoxysilane, which may be a mono-alkoxysilane, a di-alkoxysilane, a tri-alkoxysilane, or a tetra-alkoxysilane. Alkoxysilane filler treating agents are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof. In certain aspects the alkoxysilane(s) may be used in combination with silazanes, which catalyze the less reactive alkoxysilane reaction with surface hydroxyls. Such reactions are typically performed above 100° C. with high shear with the removal of volatile by-products such as ammonia, methanol and water.

Suitable filler treating agents also include alkoxysilyl functional alkylmethyl polysiloxanes, or similar materials where the hydrolyzable group may comprise, for example, silazane, acyloxy or oximo.

Alkoxy-functional oligosiloxanes can also be used as filler treating agents. Alkoxy-functional oligosiloxanes and methods for their preparation are generally known in the art. Other filler treating agents include mono-endcapped alkoxy functional polydiorganosiloxanes, i.e., polyorganosiloxanes having alkoxy functionality at one end.

Alternatively, the filler treating agent can be any of the organosilicon compounds typically used to treat silica fillers. Examples of organosilicon compounds include organochlorosilanes such as methyltrichlorosilane, dimethyldichlorosilane, and trimethyl monochlorosilane; organosiloxanes such as hydroxy-endblocked dimethylsiloxane oligomer, silicon hydride functional siloxanes, hexamethyldisiloxane, and tetramethyldivinyldisiloxane; organosilazanes such as hexamethyldisilazane and hexamethylcyclotrisilazane; and organoalkoxysilanes such as alkylalkoxysilanes with methyl, propyl, n-butyl, i-butyl, n-hexyl, n-octyl, i-octyl, n-decyl, dodecyl, tetradecyl, hexadecyl, or octadecyl substituents. Organoreactive alkoxysilanes can include amino, methacryloxy, vinyl, glycidoxy, epoxycyclohexyl, isocyanurato, isocyanato, mercapto, sulfido, vinyl-benzyl-amino, benzyl-amino, or phenyl-amino substituents. Alternatively, the filler treating agent may comprise an organopolysiloxane. Alternatively, certain filler treating agents, such as chlorosilanes, may be hydrolyzed at the filler surface. Alternatively, the filler treating agent may take advantage of multiple hydrogen bonds, either clustered or dispersed or both, as the method to bond the organosiloxane to the surface of the filler. The organosiloxane capable of hydrogen bonding has an average, per molecule, of at least one silicon-bonded group capable of hydrogen bonding. The group may be selected from: a monovalent organic group having multiple hydroxyl functionalities or a monovalent organic group having at least one amino functional group. Hydrogen bonding may be a primary mode of bonding of the organosiloxane to the filler. The organosiloxane may be incapable of forming covalent bonds with the filler. The organosiloxane capable of hydrogen bonding may be selected from the group consisting of a saccharide-siloxane polymer, an amino-functional organosiloxane, and a combination thereof. Alternatively, the polyorganosiloxane capable of hydrogen bonding may be a saccharide-siloxane polymer.

Alternatively, the filler treating agent may comprise alkylthiols such as octadecyl mercaptan and others, and fatty acids such as oleic acid, stearic acid, titanates, titanate coupling agents, zirconate coupling agents, and a combination thereof. One skilled in the art could optimize a filler treating agent to aid dispersion of the filler without undue experimentation.

The filler may be a single filler or a combination of two or more fillers that differ in at least one property such as type of filler, method of preparation, treatment or surface chemistry, filler composition, filler shape, filler surface area, average particle size, and/or particle size distribution. A filler may be included in the solid carrier component in an amount of 0 to 10%, alternatively >0 to 10% based on combined weights of all starting materials in the solid carrier component.

Method of Making the Solid Carrier Component

The solid carrier component is a solid at ambient temperature and pressure (e.g. 25° C. and 1 atmosphere). The solid carrier component may be formed by combining the starting materials in any order. The solid carrier component may be prepared by forming a mixed composition from (A) the ethylene-based polymer, (B) the maleated ethylene-based polymer, (C) the bis-hydroxyl-terminated polydiorganosiloxane, and when present (D), the filler, by dispersing under mixing or shear, e.g., with suitable mixing equipment. For example, the mixed composition may be dispersed in a vessel equipped with an agitator and/or mixing blades. The vessel may be, for example, an internal mixer, such as a Banbury, Sigma (Z) Blade, or Cavity Transfer style mixer. Alternatively or in addition, the mixed composition may be dispersed in or processed by an extruder, which may be any extruder, e.g., a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used to disperse the mixed composition described herein.

The solid carrier components prepared as described above are re-processable and may be prepared for feeding in subsequent processes. The mixed composition prepared as described above may be, for example, substantially continuous ribbons or discontinuous pellets or particles or powders. Substantially continuous ribbons can be formed by pressurizing the mixed composition and passing it through a die to create continuous strands or tapes that are subsequently cooled before being suitably packaged. Alternatively, the strand or tape may be comminuted to form pellets or powders. The mixing device may also produce the pressure and/or heat needed to process the mixed composition through the die when the mixing device is an extruder, which may be any extruder, e.g., BUSS kneader, or a single screw extruder with rotational and/or reciprocating (co-kneader) screws, as well as multi-screw devices comprising two or more screws, which may be aligned tangentially or partially/fully intermeshing, revolving in either a co- or counter-rotational direction. A conical extruder may be used for mixing and pressurizing the mixed composition. Alternately, a gear pump may be used to generate the pressure needed for extrusion after the mixed composition has been mixed. Discontinuous forms of the mixed composition may be created by chopping continuous ribbons of mixed composition into shorter lengths. Alternatively, large pieces of mixed composition may be reduced to usable sizes by use of a grinder or shredder.

The solid carrier component may be formed by a method performed continuously or semi-continuously in an extruder, such as a twin screw extruder (in which the screws are concurrently rotated, partially or fully intermeshing, alternatively counter rotated aligned either tangentially or partially or fully intermeshing). Alternatively, (C) the bis-hydroxyl-terminated polydiorganosiloxane may be disposed in the extruder concurrently with (A) the ethylene-based polymer and (B) the maleated ethylene-based polymer, (and optionally (D) the filler). Alternatively, (C) the bis-hydroxyl-terminated polydiorganosiloxane may be disposed in the extruder after melting (A) the ethylene-based polymer and/or (B) the maleated ethylene-based polymer (and before adding (D) the filler, if any will be added to the mixed composition). Alternatively, (C) the bis-hydroxyl-terminated polydiorganosiloxane may be disposed in the extruder after (D) the filler, when present, and before one or both of (A) the ethylene-based polymer and (B) the maleated ethylene-based polymer and before the mixed composition exits the extruder. Alternatively, (D) the filler may be disposed in the extruder concurrently with (C) the bis-hydroxyl-terminated polydiorganosiloxane, then (A) the ethylene-based polymer and (B) the maleated ethylene-based polymer may be disposed in the extruder to give a mixture and the temperature increased to a temperature suitable for compounding the mixture. The extruder may have one or more zones, such as 1 to 3, alternatively 1 to 12, alternatively 3 to 12, or alternatively 3 to 10 zones, where starting materials can be added. The zones may be heated at different temperatures and incorporate various functional stages including conveying, melting, mixing, deaeration, vacuum, pressurization, and forming.

Alternatively, (A) the ethylene-based polymer and (B) the maleated ethylene-based polymer may be disposed in a first zone of the extruder, which is heated at +/−30° C. within the melting temperature of (A) the ethylene-based polymer and/or (B) the maleated ethylene-based polymer. Starting material (C), the bis-hydroxyl-terminated polydiorganosiloxane, may be disposed in a second zone of the extruder, which is heated at 10° C. to 90° C. above the melting temperature of (A) the ethylene-based polymer and/or (B) the maleated ethylene-based polymer. Starting material (D), the filler, when present, may be disposed in one or more of the first, second, or subsequent zones of the extruder. Alternatively, (D) the filler and (C) the bis-hydroxyl-terminated polydiorganosiloxane may be combined before adding the resulting combination to the extruder. As noted above, the temperature utilized is typically less than a degradation temperature of the starting materials of the solid carrier component. The mixture may be stripped to remove any air, moisture or byproducts prior to pressurization and forming in the die of the extruder. The vacuum, pressurization, and forming zones may also be heated, and the temperatures utilized by the extruder, including the temperature of any zone and the die, does not exceed a degradation temperature of starting materials (A), (B), (C), and (D). The degradation temperature of starting materials (A), (B), (C), and (D) is contingent on the selection thereof, as understood by one of skill in the art. The resulting extruded strand may be comminuted by any convenient means to form the solid carrier component.

The solid carrier component is typically in particulate form, and may be, for example, in the form of particles, pellets, or powders. An average particle size of the solid carrier component is a function of desired properties and end use thereof. The solid carrier component may be a powder. Alternatively, the solid carrier component may be a pellet. Pellets typically have greater average particle sizes than powders.

Method of Use

The solid carrier component described above is useful in preparation of filled ethylene-based polymer composite articles, such as wood plastic composite (WPC) articles. The solid carrier component may be used in a WPC composition, which can be used in a method for preparing a WPC article. A method for preparing a WPC article comprises:
1) combining starting materials comprising
   (a) a lignocellulosic-based filler,
   (b) an ethylene-based polymer, and
   (c) the solid carrier component described above, thereby preparing a WPC composition; and
2) forming the WPC article from the WPC composition.

Starting Material (a) Lignocellulosic-Based Filer

The lignocellulosic-based filler comprises, alternatively consists essentially of, alternatively consists of, a lignocellulosic material. Typically, the lignocellulosic-based filler consists of the lignocellulosic material. The lignocellulosic-based filler, as well as the lignocellulosic material, may comprise any matter derived from any plant source. When the lignocellulosic-based filler consists essentially of or consists of lignocellulosic material, the lignocellulosic material may also include some water or moisture content, although the lignocellulosic material, as well as the lignocellulosic-based filler, is typically dry, i.e., does not contain any free moisture content but for that which may be associated with the relative humidity in an environment in which the lignocellulosic-based filler is prepared, derived, formed, and/or stored. The same is typically true for other species of (a) the lignocellulosic-based filler, but is noted in regards to lignocellulosic-based fillers as lignocellulosic materials generally include some water content as harvested/prepared prior to any drying or end use.

The lignocellulosic-based filler typically comprises carbohydrate polymers (e.g. cellulose and/or hemicellulose), and may further comprise an aromatic polymer (e.g. lignin). The lignocellulosic-based filler is typically a natural lignocellulosic material, i.e., is not synthetically derived. For example, the lignocellulosic-based filler is typically derived from wood (hardwood, softwood, and/or plywood). Alternatively or in addition, the lignocellulosic-based filler may comprise lignocellulosic material from other non-wood sources, such as lignocellulosic material from plants, or other plant-derived polymers, for example agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof.

Specific examples of suitable hardwoods from which the lignocellulosic-based filler may be derived include, but are not limited to, ash, aspen, cottonwood, basswood, birch, beech, chestnut, gum, elm eucalyptus, maple, oak, poplar, sycamore, and combinations thereof. Specific examples of suitable softwoods from which the lignocellulosic-based filler may be derived include, but are not limited to, spruce, fir, hemlock, tamarack, larch, pine, cypress, redwood, and combinations thereof. Combinations of different hardwoods, combinations of different softwoods, or combinations of hardwood(s) and softwood(s) may be utilized together as the lignocellulosic-based filler. The lignocellulosic-based filler may be virgin, recycled, or a combination thereof.

The lignocellulosic-based filler may have any form and size, e.g., from nanometer to millimeter particle size. For example, the lignocellulosic-based filler may comprise a powder, a pulp, a flour, sawdust, a fiber, a flake, a chip, a shaving, a strand, a scrim, a wafer, a wool, a straw, a particle, or any combination thereof. The lignocellulosic-based filler may be formed via a variety of techniques known to one of skill in the art, typically as a function of the form thereof. For example, the lignocellulosic-based filler can be prepared by comminuting logs, branches, industrial wood residue, or rough pulpwood. The lignocellulosic-based filler may be comminuted to a desired particle size. For example, the lignocellulosic-based filler may be comminuted with any convenient equipment, such as a hammer mill, which results in the lignocellulosic-based filler having a particle size suitable for use in mixing processes. The desired particle size is typically selected by one of skill in the art based on the particular mixing process utilized and desired properties of the polymer composite article. By particle size, it is meant the dimensions of the lignocellulosic-based filler, regardless of shape, and includes, for example, dimensions associated with the lignocellulosic-based filler when in the form of fibers. As known in the art, lignocellulosic-based fillers may be pelletized, or otherwise in the form of pellets, which may substantially maintain shape and dimension when incorporated into the composition or which may form smaller particles in the composition.

The shape and dimensions of the lignocellulosic-based filler is also not specifically restricted. For example, the lignocellulosic-based filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the lignocellulosic-based filler utilized, the selection of other starting materials included within the WPC composition, and the end use application of the WPC article formed therewith.

The lignocellulosic-based filler may present in the WPC composition in an amount of 10% to 89.5%, alternatively 20% to 75%, alternatively 30% to 70%, alternatively 45% to 65%, based on combined weights of all starting materials in the WPC composition. Typically, it is desirable to maximize the relative amount of (a) the lignocellulosic-based filler in the WPC composition, which reduces overall cost thereof, so long as desirable properties of the WPC article formed therewith are maintained or obtained. One skilled in the art understands that the amount of (a) the lignocellulosic-based filler may be modified for this purpose, including a balance of cost and resulting properties, as well as the presence or absence of other optional starting materials, as described below.

Starting Material (b) Ethylene-Based Polymer

Starting material (b) in the WPC composition is an ethylene-based polymer. The ethylene-based polymer may be any of the ethylene-based polymers prepared by methods such as those disclosed in PCT Publication No. WO2018/049555 and U.S. Patent Application Publication No. 2019/0023895, and the references cited therein. Alternatively, the ethylene-based polymer may be an ethylene-based polymer as described above for starting material (A) in the solid carrier component. Alternatively, the ethylene-based polymer may be selected from HDPE, MDPE, Low Density Polyethylene (LDPE), LLDPE, Very Low Density Polyethylene (VLDPE), Ultra Low Density Polyethylene (ULDPE), Low Density Low Molecular Weight Polyethylene (LD-LMWPE), or a combination thereof. Examples of suitable ethylene-based polymers, which are commercially available from The Dow Chemical Company of Midland, Mich., USA are shown below in Table 2.

TABLE 2

Ethylene - Based Polymers

| Type | Density (g/cm³) | $I_2$ (g/10 min) | Melting Temperature (° C.) |
| --- | --- | --- | --- |
| high density polyethylene | 0.950 | 12 | 132 |
| narrow molecular weight distribution high density polyethylene homopolymer | 0.952 | 6.8 | 131 |
| high density polyethylene | 0.952 | 4.4 | 131 |
| high density polyethylene | 0.952 | 10 | 130 |
| high density polyethylene | 0.954 | 20 | 130 |
| high density polyethylene homopolymer | 0.961 | 0.80 | 133 |

TABLE 2-continued

Ethylene - Based Polymers

| Type | Density (g/cm³) | I₂ (g/10 min) | Melting Temperature (° C.) |
|---|---|---|---|
| high density polyethylene homopolymer with a narrow molecular weight distribution | 0.965 | 8.3 | 133 |
| ethylene/1-octene linear-low-density polyethylene copolymer | 0.917 | 2.3 | 123 |
| ethylene/1-octene linear-low-density polyethylene copolymer | 0.919 | 6.0 | 124 |
| polyethylene resin, which is a narrow molecular weight distribution copolymer | 0.917 | 25 | 124 |

The ethylene-based polymer for use in the WPC composition may comprise virgin polymer and/or recycled polymer. Without wishing to be bound by theory, it is thought that the ethylene-based polymer may comprise ≥50% recycled polyethylene. The recycled ethylene-based polymer, if utilized, may be sourced from industrial production streams, as well as from post-industrial and/or post-consumer sources. The selection of the specific ethylene-based polymer, as well as any ratio of virgin polymer to recycled polymer, if utilized in concert, is typically a function of cost and desired properties of the WPC article formed therewith. The WPC composition may contain 10% to 80% of (b) the ethylene-based polymer, based on combined weights of all starting materials in the WPC composition. The WPC composition may contain a sufficient amount of (i) the solid carrier component described above to give the WPC composition a content of the bis-hydroxyl terminated polydiorganosiloxane of 0.5% to 4%, alternatively 1% to 4%.

The WPC composition may optionally further comprise one or more additional starting materials. For example, one or more starting materials may be selected from the group consisting of (d) an additional filler which is distinct from the lignocellulosic filler of starting material (a), (e) a colorant, (f) a blowing agent, (g) a UV stabilizer, (h) an antioxidant, (i) a process aid, (j) a preservative, (k) a biocide, (l) a flame retardant, and (m) an impact modifier. Each additional starting material, if utilized, may be present in the WPC composition in an amount of greater than 0 to 30% based on combined weights of all starting materials in the WPC composition. The WPC composition may also include other optional additives, as known in the art. Such additives are described, for example, in Walker, Benjamin M., and Charles P. Rader, eds. Handbook of thermoplastic elastomers. New York: Van Nostrand Reinhold, 1979; Murphy, John, ed. Additives for plastics handbook. Elsevier, 2001.

When selecting starting materials to include in the WPC composition, there may be overlap between types of starting materials because certain starting materials described herein may have more than one function. For example, (d) the additional filler may be a filler described above for starting material (D) in the solid carrier component. Certain of such fillers may be useful as additional fillers and as colorants, and even as flame retardants, e.g., carbon black. When selecting starting materials for the WPC composition, the starting materials selected for each embodiment are distinct from one another.

The WPC composition may be formed under mixing or shear, e.g., with suitable mixing equipment. For example, the WPC composition may be formed in a vessel equipped with an agitator and/or mixing blades. The vessel may be, for example, an internal mixer, such as a Banbury, Sigma (Z) Blade, or Cavity Transfer style mixer. Alternatively or in addition, the WPC composition may be formed in or processed by an extruder, which may be any extruder, e.g. a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for forming the WPC composition described herein.

In the method for preparing the WPC article as described above, the method also comprises forming the WPC article from the WPC composition. The WPC composition may be prepared, e.g., in the vessel, and subsequently removed from the vessel to form the WPC article with separate equipment. Alternatively, the same equipment may be utilized to prepare the WPC composition and subsequently form WPC article. For example, the WPC composition may be prepared and/or mixed in an extruder, and the extruder may be utilized to form the WPC article with the WPC composition. Alternatively, the WPC article may be formed via molding, e.g., with an injection or transfer molding process. The WPC composition may be formed independently and disposed in the mold once formed.

The method described above comprises forming the WPC article from the WPC composition, which may comprise forming the WPC composition into a desired shape. The desired shape depends on end use applications of the WPC article. One of skill in the art understands how dies for extrusion and molds for molding may be selected and created based on the desired shape of the WPC article.

The method may be performed continuously or semi-continuously in an extruder, such as a twin screw extruder (in which the screws are concurrently rotated, partially or fully intermeshing, alternatively counter rotated aligned either tangentially or partially or fully intermeshing). The solid carrier component may be disposed in the extruder concurrently with (a) the lignocellulosic-based filler and (b) the ethylene-based polymer. Alternatively, the solid carrier component may be disposed in the extruder after melting (b) the ethylene-based polymer and before adding (a) the lignocellulosic-based filler. Alternatively, the solid carrier component may be disposed in the extruder after (a) the lignocellulosic-based filler and (b) the ethylene-based polymer and before the WPC article exits the extruder. Alternatively, (a) the lignocellulosic-based filler may be disposed in the extruder concurrently with the solid carrier component, where they are heated to effect surface treatment of (a) the lignocellulosic-based filler with the hydroxyl-terminated polydiorganosiloxane in (c) the solid carrier component, then (b) the ethylene-based polymer is disposed in the extruder to give a mixture and the temperature increased to a temperature suitable for compounding the mixture and forming the WPC article. The extruder may have one or more zones, such as 1 to 3, or 3 to 8, or 1 to 12, zones, where starting materials can be added. The zones may be heated at different temperatures.

Alternatively, (b) the ethylene-based polymer may be disposed in a first zone of the extruder, which is heated at +/−30° C. within the melting temperature of (b) the ethylene-based polymer. The solid carrier component may be disposed in a second or later zone of the extruder, which may be heated at 10° C. to 90° C. above the melting temperature of (b) the ethylene-based polymer. As noted above, the temperature utilized is typically less than a degradation temperature of the starting materials of the WPC composition. Alternatively, the die of the extruder may also be heated, and the temperatures utilized by the extruder, including the temperature of any zone and the die, may be selected such that the temperatures do not exceed a degradation temperature of (a) the lignocellulosic-based filler. The degradation temperature of (a) the lignocellulosic-based filler is contingent on the selection thereof, as understood by one of skill in the art.

The method described above may be used to produce various WPC articles, such as WPC building materials. Such WPC building materials include residential and/or commercial building and construction products and applications, e.g. decking, railing, siding, fencing, window framing, flooring, trim, and skirts.

EXAMPLES

These examples are intended to illustrate the invention to one skilled in the art and are not to be interpreted as limiting the scope of the invention set forth in the claims. The starting materials in Tables 3-5 were used in these examples.

TABLE 3

Ethylene - Based Polymers Used Herein

| Starting Material | Type | Density (g/cm$^3$) | I$_2$ (g/10 min) | Melting Temperature (° C.) |
|---|---|---|---|---|
| HDPE 1 | high density polyethylene | 0.950 | 12 | 132 |
| HDPE 2 | narrow molecular weight distribution high density polyethylene homopolymer | 0.952 | 6.8 | 131 |
| HDPE 3 | high density polyethylene | 0.952 | 4.4 | 131 |
| HDPE 4 | high density polyethylene homopolymer | 0.961 | 0.80 | 133 |
| HDPE 5 | high density polyethylene | 0.954 | 20 | 130 |
| HDPE 6 | high density polyethylene | 0.952 | 10 | 130 |
| HDPE 7 | high density polyethylene | 0.965 | 8.3 | 133 |
| LLDPE 1 | ethylene/1-octene linear-low-density polyethylene copolymer | 0.917 | 2.3 | 123 |
| LLDPE 2 | ethylene/1-octene linear-low-density polyethylene copolymer | 0.919 | 6.0 | 124 |

The ethylene-based polymers in Table 3 are each commercially available from The Dow Chemical Company of Midland, Mich., USA. In Table 2, densities were measured by ASTM D792—13; melt indexes were measured by ASTM D1238—13 at 190° C. and 2.16 Kg; and melting temperatures were measured by DSC.

TABLE 4

Maleated Ethylene-Based Polymers

| | Starting Material | |
|---|---|---|
| | B-1 | B-2 |
| Type | a random ethylene copolymer incorporating a monomer which is classified as being a maleic anhydride equivalent | high density polyethylene grafted with very high maleic anhydride copolymer graft level |
| Density (g/cm$^3$) | 0.940 | 0.962 |
| I$_2$ (g/10 min) | 25 | 2.0 |
| Melting Temperature (° C.) | 108 | 130 |

The maleated ethylene-based polymers are both commercially available from The Dow Chemical Company of Midland, Mich., USA. In Table 4, densities were measured by ASTM D792—13; melt indexes were measured by ASTM D1238—13 at 190° C. and 2.16 Kg; and melting temperatures were measured by DSC. Melting temperature of B-1 was measured according to ASTM D3418—15, and melting temperature of B-2 was measured by DSC wherein a film was conditioned at 230° C. for 3 minutes before cooling at a rate of 10° C. per minute to a temperature of −40° C. After the film was kept at −40° C. for 3 minutes, the film was heated to 200° C. at a rate of 10° C. per minute.

TABLE 5

Siloxanes

| Starting Material | Description |
|---|---|
| C-1 | bis-hydroxyl-terminated polydimethylsiloxane with viscosity of 12,000 mPa · s to 15,000 mPa · s |
| C-2 | bis-hydroxyl-terminated polydimethylsiloxane with viscosity of 5,400 mPa · s to 6,600 mPa · s |
| C-3 | bis-hydroxyl-terminated polydimethylsiloxane with viscosity of 16,500 mPa · s |
| C-4 | bis-hydroxyl-terminated polydimethylsiloxane with viscosity of 20,000 mPa · s |

In Table 5, the bis-hydroxyl-terminated polydimethylsiloxanes were commercially available from Dow Silicones Corporation of Midland, Mich., USA. The viscosities of the bis-hydroxyl-terminated polydimethylsiloxanes were measured at 25° C. at 5 RPM on a Brookfield DV-III cone & plate viscometer with #CP-52 spindle.

In this Reference Example 1, a solid carrier component in pellet form was produced using a 26 mm twin screw extruder. Starting material (A) the ethylene-based polymer and starting material (B) the maleated ethylene-based polymer were fed in via the feed throat in the first barrel section. When used, starting material (D) the filler (talc, which was untreated and had an average particle size of 1.9 μm) was also fed in via the feed throat in the first barrel section. Starting material (C) the polydiorganosiloxane was injected into the fourth of eleven barrel sections onto a screw section with mixing. The resulting composition was pelletized using a Gala underwater pelletizer for consistency and collected for testing. All samples were cooled to room temperature and aged a minimum of 48 hours before any testing.

In this Reference Example 2, a solid carrier component in pellet form was produced using a 25 mm twin screw extruder. Starting material (A) the ethylene-based polymer and starting material (B) the maleated ethylene-based polymer were fed in via the feed throat in the first barrel section. When used, starting material (D) the filler: CaCO$_3$ (Calcium carbonate which was untreated and had an average particle size of 3 μm) was also fed in via the feed throat in the first barrel section. Starting material (C) the polydiorganosiloxane was injected into the fourth of twelve barrel sections onto a screw section with mixing. The resulting composition was cooled via full immersion in water bath and pelletized using a strand pelletizer. In this Reference Example 2, bleed of the bis-hydroxyl-polydiorganosiloxane from the pellets prepared in Reference Example 1 and Reference Example 2 was evaluated, as follows. Each sample (4 g) was placed into pre-weighed aluminum pans lined with Whatman™ #1 filter paper (5.5 cm diameter) such that the surface of the aluminum pan was covered fully by the filter paper, but the filter paper was not bent. The pellets were evenly spread out across the filter paper in a semi-uniform layer. The samples were left standing at room temperature on the bench or at the said temperature in a convection oven for the Aging Time. After aging, the pellets were left to stand at room temperature for at least 4 hours, and the pellets were placed in a 20 mL scintillation vial. The filter paper was weighed to determine aged filter paper weight. Bleed was determined according to the formula below:

$$\text{Bleed (\%)} = 100 \times \frac{\text{Aged Filter Paper Weight} - \text{Starting Filter Paper Weight}}{\text{Total Pellet Weight} \times \text{Fraction Siloxane in Pellet}}$$

The starting materials and their amounts are shown below in Tables 6 and 7. Aging conditions and siloxane bleed are also reported below in Tables 6 and 7.

TABLE 6

| Example | PE | PE (%) | MAPE | MAPE (%) | Siloxane | Siloxane (%) | Talc (%) | Aging T (° C.) | Aging Time (weeks) | Siloxane bleed (%) |
|---|---|---|---|---|---|---|---|---|---|---|
| Comparative 1 | HDPE 4 | 60 | B-2 | 20 | C-1 | 20 | 0 | 70 | 4 | 8.8 |
| Comparative 2 | HDPE 1 | 50 | B-2 | 25 | C-1 | 25 | 0 | 70 | 4 | 1.5 |
| Comparative 3 | HDPE 3 | 40 | B-2 | 25 | C-1 | 25 | 10 | 70 | 4 | 3.3 |
| Comparative 4 | HDPE 2 | 40 | B-2 | 25 | C-1 | 25 | 10 | 70 | 4 | 2.7 |
| Comparative 5 | HDPE 2 | 40 | B-2 | 25 | C-2 | 25 | 10 | 70 | 4 | 9 |
| Comparative 6 | HDPE 3 | 40 | B-2 | 25 | C-1 | 25 | 10 | 23 | 3 | 1.1 |
| Comparative 7 | HDPE 2 | 40 | B-2 | 25 | C-1 | 25 | 10 | 23 | 3 | 0.8 |
| Comparative 8 | HDPE 2 | 40 | B-2 | 25 | C-2 | 25 | 10 | 23 | 3 | 5.8 |
| Working 9 | LLDPE 1 | 60 | B-2 | 20 | C-1 | 20 | 0 | 70 | 4 | 0.2 |
| Working 10 | HDPE 1 | 70 | B-2 | 15 | C-1 | 15 | 0 | 70 | 4 | 0.3 |
| Working 11 | HDPE 2 | 70 | B-2 | 15 | C-1 | 15 | 0 | 70 | 4 | 0.1 |
| Working 12 | HDPE 2 | 60 | B-2 | 20 | C-1 | 20 | 0 | 70 | 4 | 0.2 |
| Working 13 | LLDPE 2 | 70 | B-2 | 15 | C-1 | 15 | 0 | 70 | 4 | 0.2 |
| Working 14 | HDPE 2 | 60 | B-2 | 20 | C-1 | 20 | 0 | 70 | 4 | 0.2 |
| Working 15 | HDPE 2 | 80 | B-2 | 10 | C-1 | 10 | 0 | 70 | 4 | 0.3 |
| Working 16 | LLDPE 2 | 60 | B-2 | 20 | C-1 | 20 | 0 | 70 | 4 | 0.1 |
| Working 17 | HDPE 2 | 60 | B-2 | 20 | C-2 | 20 | 0 | 70 | 4 | 0.2 |
| Working 18 | LLDPE 2 | 60 | B-2 | 20 | C-2 | 20 | 0 | 70 | 4 | 0.1 |
| Working 19 | LLDPE 2 | 60 | B-2 | 20 | C-1 | 20 | 0 | 70 | 4 | 0.2 |
| Working 20 | HDPE 1 | 60 | B-2 | 20 | C-1 | 20 | 0 | 70 | 4 | 0.2 |
| Working 21 | HDPE 1 | 80 | B-2 | 10 | C-1 | 10 | 0 | 70 | 4 | 0.3 |
| Working 22 | LLDPE 2 | 80 | B-2 | 10 | C-1 | 10 | 0 | 70 | 4 | 0.2 |
| Working 23 | HDPE 3 | 60 | B-2 | 20 | C-1 | 20 | 0 | 70 | 3 | 0.6 |
| Working 24 | HDPE 3 | 50 | B-2 | 20 | C-1 | 20 | 10 | 70 | 3 | 0.9 |
| Working 25 | HDPE 2 | 50 | B-2 | 20 | C-1 | 20 | 10 | 70 | 3 | 0.7 |
| Working 26 | HDPE 2 | 60 | B-1 | 20 | C-1 | 20 | 0 | 70 | 3 | 0.4 |
| Working 27 | HDPE 3 | 60 | B-2 | 20 | C-2 | 20 | 0 | 70 | 3 | 0.5 |
| Working 28 | HDPE 2 | 60 | B-1 | 20 | C-2 | 20 | 0 | 70 | 3 | 0.8 |
| Working 29 | HDPE 2 | 60 | B-2 | 20 | C-2 | 20 | 0 | 70 | 3 | 0.6 |
| Working 30 | HDPE 2 | 60 | B-2 | 20 | C-1 | 20 | 0 | 70 | 3 | 0.1 |
| Working 31 | HDPE 3 | 60 | B-2 | 20 | C-1 | 20 | 0 | 23 | 3 | 0.2 |
| Working 32 | HDPE 3 | 50 | B-2 | 20 | C-1 | 20 | 10 | 23 | 3 | 0.4 |
| Working 33 | HDPE 2 | 50 | B-2 | 20 | C-1 | 20 | 10 | 23 | 3 | 0.3 |
| Working 34 | HDPE 2 | 60 | B-1 | 20 | C-1 | 20 | 0 | 23 | 3 | 0.3 |
| Working 35 | HDPE 3 | 60 | B-2 | 20 | C-2 | 20 | 0 | 23 | 3 | 0.1 |
| Working 36 | HDPE 2 | 60 | B-1 | 20 | C-2 | 20 | 0 | 23 | 3 | 0.3 |
| Working 37 | HDPE 2 | 60 | B-2 | 20 | C-2 | 20 | 0 | 23 | 3 | 0.2 |
| Working 38 | HDPE 2 | 60 | B-2 | 20 | C-1 | 20 | 0 | 23 | 3 | 0.1 |
| Working 39 | HDPE 7 | 55 | B-2 | 20 | C-4 | 25 | 0 | 70 | 2 | 0.01 |
| Working 40 | HDPE 3 | 50 | B-2 | 25 | C-3 | 25 | 0 | 70 | 2 | 0.1 |
| Working 41 | LLDPE 2 | 70 | B-2 | 20 | C-2 | 10 | 0 | 70 | 2 | Non-detecable |

TABLE 7

| Example | PE | PE (%) | MAPE | MAPE (%) | Siloxane | Siloxane (%) | CaCO3 (%) | Aging T (° C.) | Aging time (weeks) | Siloxane bleed (%) |
|---|---|---|---|---|---|---|---|---|---|---|
| Working 42 | HDPE 3 | 40 | B-2 | 25 | C-3 | 25 | 10 | 70 | 2 | 0.79 |

Note:
Comparative examples 1 to 8 and Working examples 9 to 38 were made by the method of Reference Example 1. Working examples 39-42 were made by the method of Reference Example 2.

INDUSTRIAL APPLICABILITY

The EXAMPLES above show that a solid carrier component with low bleed of the bis-hydroxyl-terminated polydiorganosiloxane could be prepared. "Low bleed" means that bis-hydroxyl-terminated polydiorganosiloxane migrating out of the solid carrier component is <0.5% after aging at 23° C. for up to 3 weeks and/or <1% after aging at 70° C. for at least 3 weeks, as measured by the test method in Reference Example 2. Alternatively, "Low bleed" may also refer to an amount of bis-hydroxyl-terminated polydiorganosiloxane migrating out of the solid carrier component that is <0.8% after aging at 70° C. for at least 2 weeks.

Working Examples 9-38 showed that a low bleed solid carrier component could be prepared using 40 weight % to 80 weight % of (A) an ethylene-based polymer as described above, 10 weight % to <25 weight % of (B) a maleated ethylene-based polymer as described above, 10 weight % to <25 weight % of (C) a bis-hydroxyl-terminated polydiorganosiloxane as described above; and 0 to 10 weight % of (D) a filler as described above.

Comparative Example 1 showed that using an ethylene-based polymer with a melt index <2 g/10 min failed to produce a solid carrier component with bleed <1% after aging at 70° C. for 4 weeks, however, Working Examples 9, 12, 14, 16, 19, and 20 showed that with the same types and amounts of each of the maleated ethylene-based polymer and the bis-hydroxyl-terminated polydiorganosiloxane, a solid carrier component with bleed <1% after aging at 70° C. for 4 weeks could be produced using different ethylene-based polymers with melt indexes ≥2.3 g/10 min. Comparative Examples 2-8 showed that using amounts ≥25% of each of a maleated ethylene-based polymer and a bis-hydroxyl-terminated polydiorganosiloxane produced solid carrier components that did not have low bleed under the conditions tested in Reference Example 2.

Definitions and Usage of Terms

Unless otherwise indicated by the context of the specification: all amounts, ratios, and percentages herein are by weight; the articles 'a', 'an', and 'the' each refer to one or more; and the singular includes the plural. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

The abbreviations used herein have the definitions in Table 8.

TABLE 8

| Abbreviation | Definition |
| --- | --- |
| ° C. | degrees Celsius |
| cm | centimeters |
| cSt | centistokes |
| DSC | differential scanning calorimetry |
| g | grams |

TABLE 8-continued

| Abbreviation | Definition |
| --- | --- |
| GPC | gel permeation chromatography |
| HDPE | high-density polyethylene |
| Kg | kilograms |
| LLDPE | linear-low-density polyethylene |
| MAPE | maleated ethylene-based polymer |
| MDPE | medium-density polyethylene |
| mg | milligrams |
| min | minutes |
| mL | milliliters |
| mm | millimeters |
| mPa · s | milliPascal · seconds |
| MWD | molecular weight distribution |
| N | normal |
| PDI | polydispersity index |
| PE | ethylene-based polymer |
| PTFE | polytetrafluoroethylene |
| μL | microliters |
| ULDPE | ultra low density polyethylene, which has a density of 0.880 to 0.912 g/cm3, and which may be prepared with Ziegler-Natta catalysts, chrome catalysts, or single-site catalysts including, but not limited to, bis-metallocene catalysts and constrained geometry catalysts |
| μm | micrometers |
| WPC | wood plastic composite |

The following test methods were used to measure properties of the starting materials herein.

Melt indices of ethylene-based polymers and maleated ethylene-based polymers, abbreviated $I_2$ or I2, were measured in accordance to ASTM D1238—13 at 190° C. and at 2.16 Kg. Their values are reported in g/10 min.

Samples of ethylene-based polymers and maleated ethylene-based polymers were prepared for density measurement according to ASTM D4703. Measurements were made, according to ASTM D792—13, Method B, within one hour of sample pressing.

Peak melting point (Melting Temperature) of ethylene-based polymers and maleated ethylene-based polymers was determined by DSC, where a film was conditioned at 230° C. for 3 minutes before cooling at a rate of 10° C. per minute to a temperature of −40° C. After the film was kept at −40° C. for 3 minutes, the film was heated to 200° C. at a rate of 10° C. per minute.

"MWD" is defined as the ratio of weight average molecular weight to number average molecular weight ($M_w/M_n$). $M_w$ and $M_n$ are determined according to conventional GPC methods.

Viscosities of polydiorganosiloxanes were measured at 25° C. at 5 RPM on a Brookfield DV-III cone & plate viscometer with #CP-52 spindle.

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 18" may be further delineated into a lower third, i.e., 1 to 6, a middle third, i.e., 7 to 12, and an upper third, i.e., from 13 to 18, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

Embodiments of the Invention

In a first embodiment, a solid carrier component for use in preparing a WPC article comprises:
40 weight % to 80 weight % of (A) an ethylene-based polymer with a melt index>2 g/10 min measured according to ASTM D1238—13 at 190° C. and 2.16 Kg,
10 weight % to <25 weight % of (B) a maleated ethylene-based polymer,
10 weight % to <25 weight % of (C) a bis-hydroxyl-terminated polydialkylsiloxane of formula

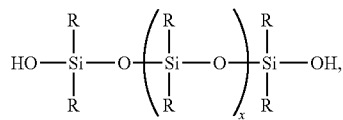

where each R is an independently selected alkyl group of 1 to 18 carbon atoms, and subscript x has a value sufficient to give the polydialkylsiloxane a viscosity of 5,000 mPa·s to 25,000 mPa·s measured at 25° C. at 5 RPM on a Brookfield DV-III cone & plate viscometer with #CP-52 spindle; and 0 to 10 weight % of (D) a filler,
where each weight % is based on combined weights of all starting materials in the solid carrier component.

In a second embodiment, in the solid carrier component of the first embodiment, the melt index of the high density polyethylene is 2.3 g/10 min to 20 g/10 min, and starting material (A) is present at 50 weight % to 70 weight %.

In a third embodiment, in the solid carrier component of the first embodiment or the second embodiment, the melt index of the high density polyethylene is 4.4 g/10 min to 20 g/10 min.

In a fourth embodiment, in the solid carrier component of any one of the preceding embodiments, starting material (B), the maleated ethylene-based polymer, has a melt index of 2 g/10 min to 25 g/10 min measured according to ASTM D1238—13 at 190° C. and 2.16 Kg and a maleic anhydride content of 0.25 weight % to 2.5 weight %, and starting material (B) is present at 10 weight % to 20 weight %.

In a fifth embodiment, in any one of the preceding embodiments, in the formula for starting material (C), the bis-hydroxyl terminated polydialkylsiloxane, each R is an independently selected alkyl group of 1 to 12 carbon atoms, and subscript x has a value sufficient to give the polydialkylsiloxane the viscosity of 5,000 mPa·s to 15,000 mPa·s.

In a sixth embodiment, in the solid carrier component of the fourth embodiment, each R is a methyl group, and (C) the polydialkylsiloxane is present at 10 weight % to 20 weight %.

In a seventh embodiment, in the solid carrier component of any one of the preceding embodiments, starting material (D) is present in an amount >0 to 10 weight %, and starting material (D) comprises talc.

In an eighth embodiment, the solid carrier component of any one of the first to sixth embodiments is free of starting material (D), the filler.

In a ninth embodiment, the solid carrier component of any one of the first to seventh embodiments, the solid carrier component consists essentially of starting materials (A), (B), (C), and (D).

In a tenth embodiment, in any one of the first embodiment to the sixth embodiment or the eighth embodiment, the solid carrier component consists essentially of starting materials (A), (B), and (C).

In an eleventh embodiment, the solid carrier component of the tenth embodiment consists of starting materials (A), (B), and (C).

In a twelfth embodiment, a method for preparing a composition for a wood plastic composite article comprises combining:
a sufficient amount of (i) the solid carrier component of any one of the preceding embodiments give the composition a content of the bis-hydroxyl terminated polydiorganosiloxane of 0.5 weight % to 4 weight %;
10 weight % to 80 weight % based on total weight of the composition of (ii) an ethylene-based polymer, which may be the same as or different from the high density polyethylene for starting material (A) in the solid carrier component; and
10 weight % to 89.5 weight % based on total weight of the composition of (iii) a lignocellulosic-based filler.

In a thirteenth embodiment, in the method of the twelfth embodiment, the lignocellulosic-based filler comprises a lignocellulosic material derived from wood, plants, agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof.

In a fourteenth embodiment, in the method of the twelfth embodiment or the thirteenth embodiment, the lignocellulosic-based filler is a wood filler comprising lignin in an amount of 18 weight % to 35 weight % and carbohydrate in an amount of 65 weight % to 75 weight %, and optionally inorganic minerals in an amount up to 10 weight %.

In a fifteenth embodiment, in the method of any one of the twelfth to the fourteenth embodiments, the lignocellulosic-based filler is a wood filler comprising 29 weight % to 57 weight % alpha-cellulose.

In an sixteenth embodiment, in the method of any one of the twelfth to the fifteenth embodiments, (ii) the ethylene-based polymer is a polyethylene selected from the group consisting of High Density Polyethylene (HDPE), Medium Density Polyethylene (MDPE), Low Density Polyethylene (LDPE), Linear Low Density Polyethylene (LLDPE), Low Density Low Molecular Weight Polyethylene (LDLMWPE), and a combination thereof.

In a seventeenth embodiment, in the method of any one of the twelfth to the sixteenth embodiments, the ethylene-based polymer is selected from the group consisting of HDPE, LLDPE, and a combination thereof.

In an eighteenth embodiment, in the method of any one of the twelfth to the seventeenth embodiments, the ethylene-based polymer comprises 50% recycled polyethylene In a nineteenth embodiment, the method of any one of the twelfth to the eighteenth embodiments further comprises forming a wood plastic composite article from the composition.

In a twentieth embodiment, in the method of the nineteenth embodiment, the composition further comprises an additional starting material selected from the group consisting of (e) an additional filler which is distinct from the lignocellulosic-based filler of starting material (a), (f) a colorant, (g) a blowing agent, (h) a UV stabilizer, (i) an antioxidant, (j) a process aid, (k) a preservative, (l) a biocide, (m) a flame retardant, (n) an impact modifier, and (o) a combination of two or more thereof.

In a twenty-first embodiment, in the method of the nineteenth embodiment or the twentieth embodiment, the wood plastic composite article is selected from the group consisting of decking, railing, fencing, siding, flooring, trim, skirts, and window framing.

In a twenty-second embodiment, in the method of the twenty-first embodiment, the wood plastic composite article is decking.

In a twenty-third embodiment, the method of the twenty-second embodiment further comprises: adding a cap stock layer to the decking after forming.

The invention claimed is:

1. A solid carrier component comprising:
   40 weight % to 80 weight % of (A) an ethylene-based polymer with a melt index >2 g/10 min measured according to ASTM D1238—13 at 190° C. and 2.16 Kg,
   10 weight % to <25 weight % of (B) a maleated ethylene-based polymer,
   10 weight % to <25 weight % of (C) a bis-hydroxyl terminated polydiorganosiloxane with a viscosity of 5,000 mPa·s to 25,000 mPa·s measured at 25° C. at 5 RPM on a Brookfield DV-III cone & plate viscometer with #CP-52 spindle; and
   0 to 10 weight % of (D) a filler,
   where each weight % is based on combined weights of all starting materials in the solid carrier component.

2. The solid carrier component of claim 1, where for starting material (A) the melt index is 2.3 g/10 min to 12 g/10 min, the density is 0.917 g/cm³ to 0.952 g/cm³ measured according to ASTM D792—13 and starting material (A) is present at 50 weight % to 70 weight %.

3. The solid carrier component of claim 1, where starting material (A) is selected from the group consisting of an ethylene homopolymer and an ethylene/1-octene copolymer.

4. The solid carrier component of claim 1, where starting material (B) has a melt index of 0.1 g/10 min to 25 g/10 min and a maleic anhydride content of 0.25 weight % to 2.5 weight %, and starting material (B) is present at 10 weight % to 20 weight %.

5. The solid carrier component of claim 1, where starting material (C) is a bis-hydroxyl-terminated polydialkylsiloxane of formula

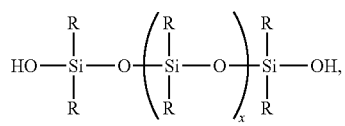

where each R is an independently selected alkyl group of 1 to 12 carbon atoms, and subscript x has a value sufficient to give the polydialkylsiloxane the viscosity of 5,000 mPa·s to 15,000 mPa·s.

6. The solid carrier component of claim 5, where each R is a methyl group, and starting material (C) is present at 10 weight % to 20 weight %.

7. The solid carrier component of claim 1, where starting material (D) is present in an amount >0 to 10 weight %, and starting material (D) comprises talc.

8. The solid carrier component of claim 1, where the solid carrier component is free of starting material (D), the filler.

9. The solid carrier component of claim 1, where combined weights of starting materials (A), (B), (C), and (D) total 100 weight % of the solid carrier component.

10. A method for preparing a composition for a wood plastic composite article comprising
   a sufficient amount of (i) a solid carrier component to give the composition a content of the bis-hydroxyl terminated polydiorganosiloxane of 0.5 weight % to 4 weight %;
   10 weight % to 80 weight % based on total weight of the composition of (ii) an ethylene-based polymer, which may be the same as or different from the ethylene-based polymer for starting material (A) in the solid carrier component; and
   10 weight % to 89.5 weight % based on total weight of the composition of (iii) a lignocellulosic-based filler; where the solid carrier component comprises
      40 weight % to 80 weight % of (A) an ethylene-based polymer with a melt index >2 g/10 min measured according to ASTM D1238—13 at 190° C. and 2.16 Kg,
      10 weight % to <25 weight % of (B) a maleated ethylene-based polymer,
      10 weight % to <25 weight % of (C) a bis-hydroxyl terminated polydiorganosiloxane with a viscosity of 5,000 mPa·s to 25,000 mPa·s measured at 25° C. at 5 RPM on a Brookfield DV-III cone & plate viscometer with #CP-52 spindle; and
      0 to 10 weight % of (D) a filler,
      where each weight % in the solid carrier component is based on combined weights of all starting materials in the solid carrier component.

11. The method of claim 10, where (iii) the lignocellulosic-based filler comprises a lignocellulosic material derived from wood, plants, agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof.

12. The method of claim 10, where (ii) the ethylene-based polymer is a polyethylene selected from the group consisting of High Density Polyethylene, Medium Density Polyethylene, Low Density Polyethylene, Linear Low Density Polyethylene, Low Density Low Molecular Weight Polyethylene, and a combination thereof.

13. The method of claim 12, where (ii) the ethylene-based polymer comprises ≥50% recycled polyethylene.

14. The method of claim 10, further comprising use of the composition to fabricate the wood plastic composite article.

15. The method of claim 14, where the wood plastic composite article is a building material selected from the group consisting of decking, railing, fencing, siding, trim, skirts, window framing, and flooring.

16. A solid carrier component comprising:

40 weight % to 80 weight % of (A) an ethylene-based polymer with a melt index >2 g/10 min measured according to ASTM D1238—13 at 190° C. and 2.16 Kg, 10 weight % to 25 weight % of (B) a maleated ethylene-based polymer, 10 weight % to 25 weight % of (C) a bis-hydroxyl terminated polydiorganosiloxane with a viscosity of 5,000 mPa·s to 25,000 mPa·s measured at 25° C. at 5 RPM on a Brookfield DV-III cone & plate viscometer with #CP-52 spindle; and 0 to 10 weight % of (D) a filler, where each weight % is based on combined weights of all starting materials in the solid carrier component.

* * * * *